Oct. 25, 1960

R. C. COMPTON 2,957,574

APPARATUS FOR CONTINUOUSLY FEEDING
ARTICLES OF FINITE LENGTH

Filed June 14, 1956

INVENTOR.
ROY C. COMPTON

BY

ATTORNEYS

Fig. 2.

INVENTOR.
ROY C. COMPTON

Oct. 25, 1960

R. C. COMPTON

2,957,574

APPARATUS FOR CONTINUOUSLY FEEDING
ARTICLES OF FINITE LENGTH

Filed June 14, 1956

INVENTOR.
ROY C. COMPTON

BY

ATTORNEYS

INVENTOR.
ROY C. COMPTON

INVENTOR.
ROY C. COMPTON
BY
ATTORNEYS.

United States Patent Office

2,957,574
Patented Oct. 25, 1960

2,957,574
APPARATUS FOR CONTINUOUSLY FEEDING ARTICLES OF FINITE LENGTH

Roy C. Compton, China Lake, Calif., assignor to United States of America as represented by the Secretary of the Navy Filed June 14, 1956, Ser. No. 591,510

3 Claims. (Cl. 226—111)

(Granted under Title 35, U.S. Code (1952), sec. 266)

The invention described herein may be manufactured and used by or for the Government of the United States of America for governmental purposes without the payment of any royalties thereon or therefor.

This invention relates to improved coating methods and apparatus and more specifically to methods and apparatus for the peripheral coating of articles of finite length.

The peripheral coating of articles of finite length has been accomplished in many ways in the prior art, as by dipping, spraying, or brushing, but each of these means is subject to the disadvantages of wasteful individual handling of the articles and of difficulty in controlling the thickness of the coating. In cases where coating thickness and/or the concentricity of the outer diameter of the finished coated article are critical, as in the formation of a coating of inhibiting material on a grain of solid propellant material, the coating material may be applied by an extrusion technique, as by pushing the article to be coated through a cross-head or die which is arranged to deposit coating material around the article. Such extrusion coating devices are known in the art and the details thereof do not form a part of this invention and are not specifically described herein.

In the use of the extrusion coating technique the greatest difficulties which are met reside in the fact that individual handling of pieces has been almost universally used, which gives rise to difficulties in maintaining such constant speeds through the die as to result in uniform coating. Moreover, there is a loss of efficiency in the handling of the pieces individually. Where the nature of the work is such that it may be broken up, as by sawing, the problem is obviously of less importance, since a single substantial length of material may readily be pushed through a die at constant speed and then broken or cut as desired. With certain types of work, however, the pieces must be handled in relatively short, finite lengths. As an example, in the coating of explosive or highly inflammatory material (such as grains of solid rocket propellant material) with surface coatings of burning inhibiting material, it is not feasible, for safety reasons, to break or cut the work after coating. Similarly where work pieces of other types are machined prior to coating they must be treated as finite lengths.

This invention is predicated on the discovery that articles of relatively short finite length can be continuously coated with certain types of material, without the individual handling required in the prior art, by the expedient of abutting the pieces end to end and driving the continuous column thus formed through an extrusion type coating cross-head to form a single continuous sheath of coating material over the column of work pieces and subsequently pulling the pieces apart to tear the coating material between adjacent pieces. The conveying method or technique and the method of pulling the pieces apart are novel and essential components of the coating method.

Implementation of these methods by mechanical means has given rise to conveyor structure capable of causing work pieces of finite length to maintain end-to-end contact with one another, to be forced at constant speed through a cross-head for coating and to be pulled apart after being coated, and this structure and its subcombinations are described in detail herein, as illustrative of means for performing the novel method. In the ensuing description the exemplary structure is described as handling prepared lengths or grains of combustible material intended for use as the solid propellant components of jet propelled rockets. In many rocket designs it is essential that the outer surface of the grain be covered with a combustion inhibiting coating and the exemplary apparatus is described in this connection although it and its components are obviously adapted to handle any material of suitable configuration.

It is an object of this invention to provide novel methods and means for positioning articles of finite length in end-to-end relationship and to forcibly propel the resulting column at constant metered speed.

A further object of this invention is to provide coating apparatus wherein conveyor means feeding to and from a coating station are of a structure to insure maintenance of the same constant vertical and horizontal center line for a column of work pieces being continually conveyed to and through the coating apparatus, regardless of size variations of such work pieces.

Still another object of this invention is the provision of conveyor means in which oppositely disposed drive components are utilized to form a conveyor in which articles of finite length are caused to abut one another in end-to-end relationship and to be conveyed forcefully at a constant speed.

A still further object of this invention is the provision of a drive roller assembly unit which is effective in one position to prevent surging of an article passing therethrough in response to accelerating forces tending to exceed the desired speed of motion and to release the conveying roller pressure if the article strikes an obstruction which is effective in another position to release to allow the article to move more quickly in response to a surge of accelerating force and to closely grip the article to force its motion at the desired speed when an obstacle is met.

Other objects and many of the attendant advantages of the present invention will be readily appreciated as the invention become better understood by reference to the following detailed description when considered in connection with the accompanying drawings, wherein.

The coating method of the present invention, as discussed hereinabove involves the end-to-end placement of articles, conveying of the resulting column of articles through a coating zone where a single continuous film is formed over the column, and then pulling the articles apart to break the film in the area of the interfaces of adjacent articles. In a narrower sense, when the nature of the article being coated and the desired thickness of coating and outer diameter of the finished coated article are critical, the method further depends upon specific coating techniques (such as the use of extrusion crosshead coating devices) upon closely regulatable speed and center line maintenance in passing through the coating device, and in the provision of means to handle the work pieces efficiently and without danger of damage to either the work pieces or the coatings formed thereon. In order to best illustrate the adaptability and flexibility of the methods and apparatus of the present invention, the invention has been described herein in connection with the coating of a grain of solid propellant material with an external coating of combustion inhibiting material. In this particular usage of the nature of the work piece, its final outer diameter, the thickness and quality of the coating and freedom from buckling or other damage of the work piece are all critical, and exemplary apparatus for handling and coating such articles is illustrated in the drawings, wherein like reference numerals have been appended to like parts throughout.

Figure 1:
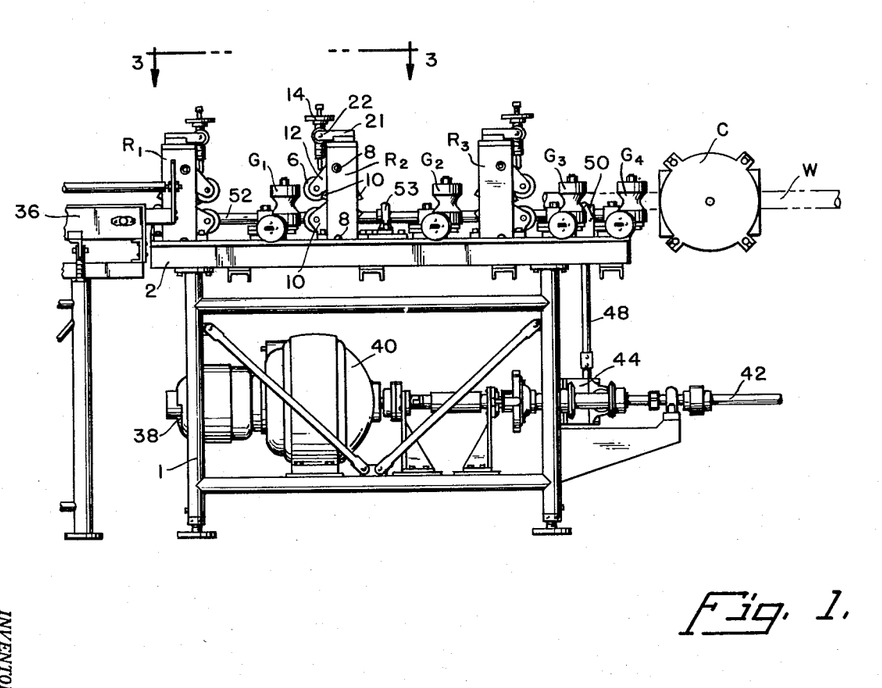
Fig. 1 is a front elevational view of the constant speed conveying device forming the pre-coating or pre-inhibiting stage of an apparatus for carrying out the methods of the present invention.
Figure 2:
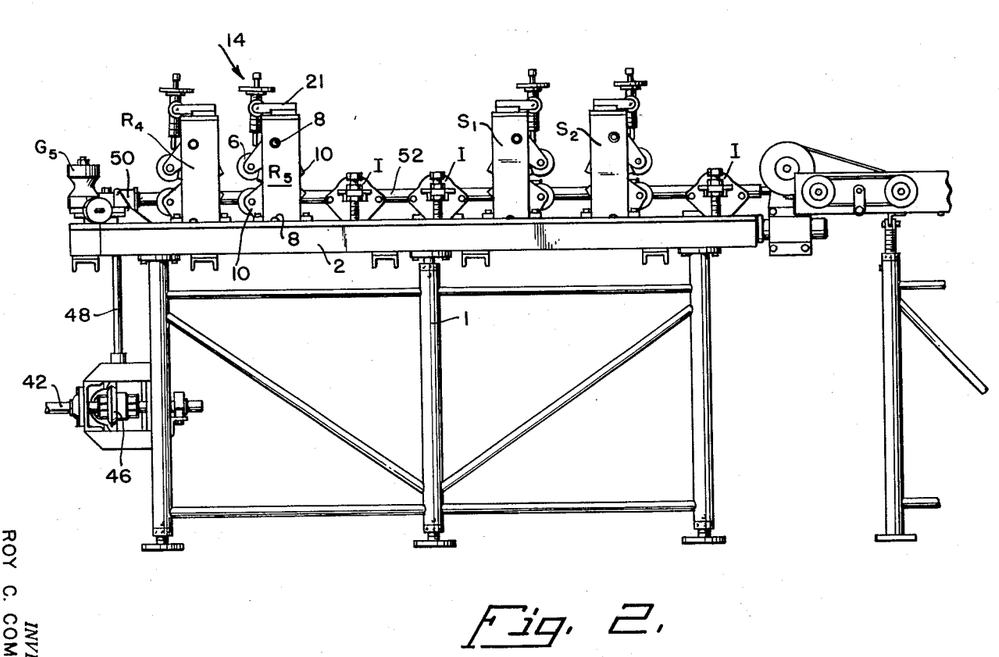
Fig. 2 is a front elevational view of the post-coating or post-inhibiting stage of the apparatus and forms a continuation of the Fig. 1 showing, the figures being separated only for ease of illustration.

Attention is now directed to Figs. 1 and 2 which together comprise a showing of a complete conveying and coating apparatus according to this invention. Fig. 1 shows a conveyor for the constant speed movement of a column of articles of finite length to and through a coating device and is generally designated as a pre-coating or pre-inhibiting station whereas Fig. 2 shows differential speed conveying means for assisting the pieces through the coating device and for separating adjacent pieces from one another, and is generally designated as a post-coating or post-inhibiting station.

The two conveyor stations are arranged upon supporting frames 1 upon which spaced parallel longitudinal guide rails 2 are mounted in each case. The guide rails are vertically tapped at regular intervals to provide means for interchangeable and adjustable attachment of drive roller assemblies R and S, guide rollers G, and idler support rollers I, to be later described, this attachment feature being best illustrated in Figs. 3 and 4. The drive roller assemblies R and the guide roller assemblies G cooperate, by virtue of structure to be later described, to maintain the same constant vertical and horizontal center line for a column of work pieces being continually conveyed to and through a coating device, regardless of size variations of such work pieces.

Figure 3:
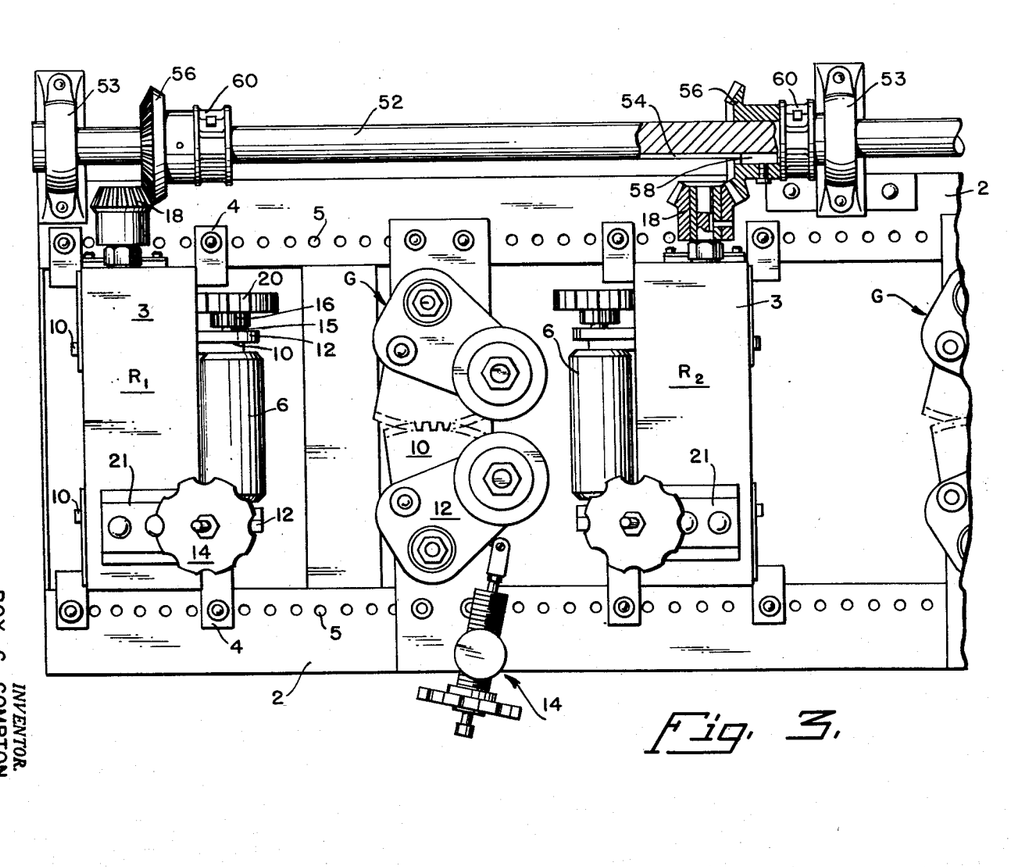
Fig. 3 is an enlarged top elevation of that portion of Fig. 1 between the arrows 3—3, illustrating the construction and arrangement of one opposed pair of drive roller assemblies and of side guide rollers utilized therewith, this combination constituting a metering assembly.
Figure 5:
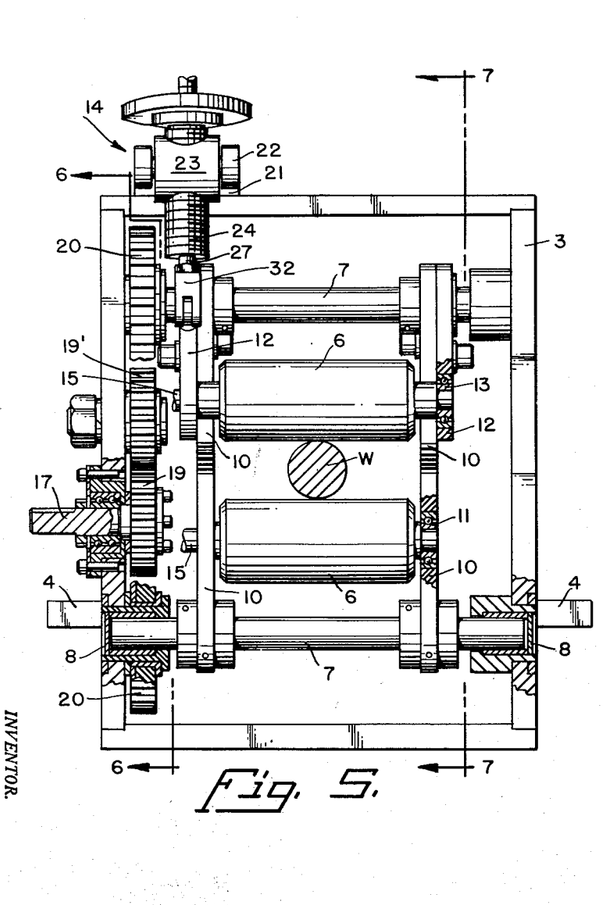
Fig. 5 is an elevational view of a drive roller assembly utilized in the apparatus of Figs. 1 and 2, some parts being omitted and others being shown in section for clarity of illustration.
Figure 6:
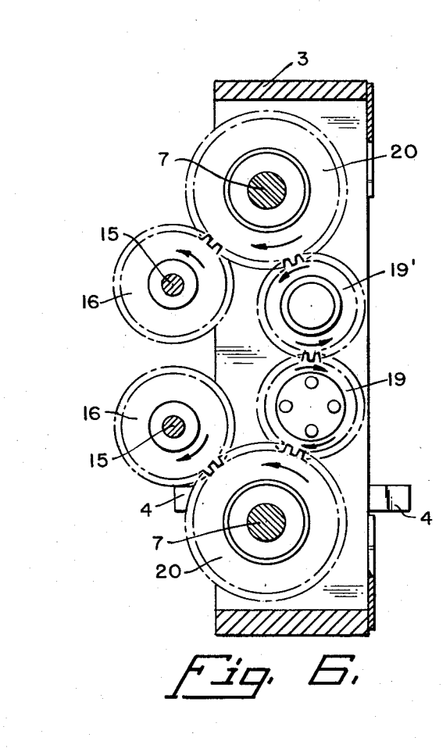
Fig. 6 is a sectional view of the drive roller assembly, taken along the line 6—6 of Fig. 5, and illustrating the gear arrangement for driving both rolls simultaneously at equal speeds.
Figure 7:
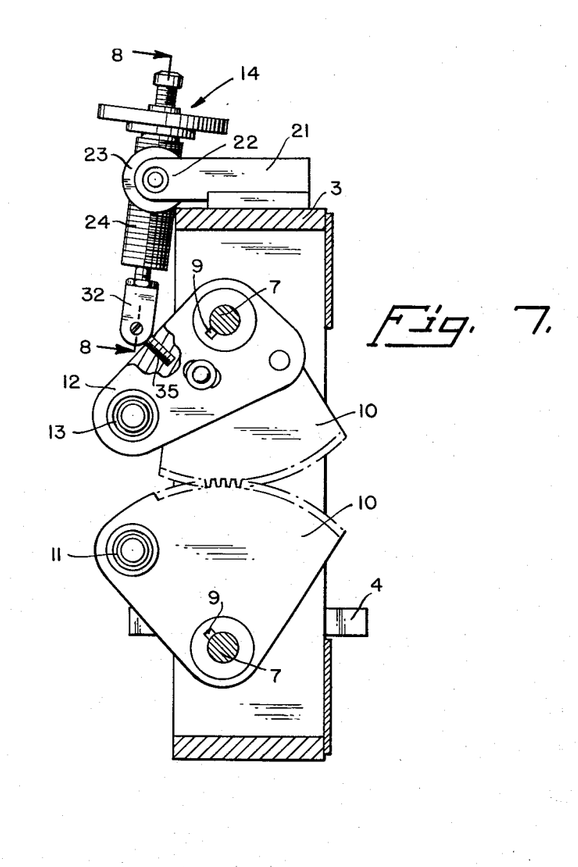
Fig. 7 is a sectional view of the drive roller assembly taken along the line 7—7 of Fig. 5 and illustrating the arrangement whereby the drive rollers are maintained equidistant from the center line of the work pieces being conveyed.
Figure 8:
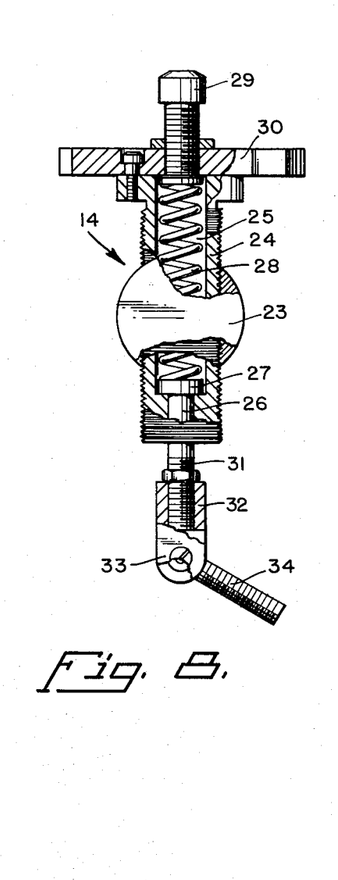
Fig. 8 is a schematic view of adjusting means utilized to control the pressure and clearance between the drive rollers for passing different size objects, parts being broken away for clarity of illustration.

The drive roller assembly construction is best illustrated in detail in Figs. 5, 6, 7 and 8, it being notable that two types of such assemblies are shown (with the drive rollers oppositely disposed relative to the direction of movement of the work), as may be seen by comparing $R_1$ and $R_2$ in Figs. 1 and 3. The structure and arrangement of the two types and the principles upon which their operation is based are so similar that the description of one such unit should be sufficient. The drive roller assemblies each comprises a vertical frame 3 having outwardly extending tapped lugs 4 for selective attachment to various positions on guide rails 2 by bolts extending through said lugs and appropriate holes 5 in said guide rails. A pair of opposed drive rolls 6 are adjustably mounted in the frame 3 in such a manner as to be always equally displaced from a position represented by the center line of the work piece W, as best seen in Fig. 5 and so as to be always driven at equal speeds. Such an arrangement is accomplished by providing a pair of roller support shafts 7 freely rotatably supported in frame 3, as by suitable bearings 8, at distances equally removed from a horizontal center line of the conveyor path. Keyed to each of said shafts, as at 9, are a pair of sector gears 10 (best seen in Fig. 7) spaced apart a suitable distance to provide space therebetween for support of drive rolls 6. The lower sector gears are of greater extent than the upper and are provided with opposed bearings 11 freely rotatably supporting the lower drive roller. The upper sector gears have opposed control links 12 attached thereto for movement therewith (see Fig. 7). The links 12 have opposed bearings 13 for freely rotatably supporting the upper drive roll in angular and horizontal disposition equal and opposite to that of the lower roll as shown in Figs. 5, 6, and 7. This arrangement of interengaged sector gears 10 insures equal and opposite deviation of the two rolls 6 from the vertical center line of a column of work pieces passing therethrough, if either or both of the rolls are displaced in response to size deviations in the work pieces. The shafts of both upper and lower drive rolls 6 are extended on one side to extend through the bearings in link 12 and in lower sector gear 10 respectively, these extensions being represented by the reference numeral 15 in Fig. 5, and identical gear wheels 16 are keyed to the ends of said shafts.

Fig. 6 illustrates the drive means utilized to drive the two rolls 6, 6 at equal speeds, it being noteworthy at this point that, by virtue of the meshing of the teeth of sector gears 10 the two rolls must always have equal and opposite vertical displacement from a central horizontal plane. The driving gear train is arranged in a common vertical plane as shown in Fig. 6, and the gears 16 have not been shown in Fig. 5 in order that the other portions of the drive means might be more clearly seen. The gear train is driven by rotation of the shaft 17, as by level gear 18 (see Figs. 3 and 4). Shaft 17 extends through the wall of frame 3 in which it is supported for rotation by suitable bearing means, as best shown in Fig. 5, and is provided internally with a face plate to which a driving gear 19 is attached by suitable means, as by headed bolts. A gear wheel 19' of identical size and tooth arrangement as gear 19 is freely rotatably supported (by journal means extending through frame 3) in a vertically aligned plane with gear 19 and with the gear teeth meshed so that gear 19' is driven in a direction opposite to that of gear 19 and at equal speed. By reference to Fig. 6 it may be seen that the axes of gears 19 and 19' are offset from the two shafts 7. Identical gear wheels 20 are freely rotatably mounted on said shafts 7 as best shown in Fig. 6 to be driven at equal and opposite speeds by the gears 19 and 19'. The teeth of gears 20 are engaged by those of the gears 16 on the shafts 15 of the drive rolls 6. Thus, gear wheels 16 (and therefore the rolls 6) may be driven at opposite and equal speeds even though they are adjusted to various positions relative to a central horizontal plane or to gears 20, since the gear teeth must remain in contact in the various possible positions of the rolls, because the pivotal axes of each of the adjustment gear sectors 10 has the same center as the axis of rotation of the related driving gear 20. Thus, if a work piece W having variations in thickness should be passing through an assembly R, the driving force is constant even though the rollers 6 change position to accommodate such variations.

The drive roller assemblies R and S are each provided with means to adjustably limit the smallest permissible clearance between the rollers in order to prevent the rollers from closing or "biting in" between successive articles, said means including spring tension means to control the pressure of the rollers on the articles being conveyed and thus the pressure at which the rollers will be displaced by oversize articles. This adjustment device is generally designated by the reference numeral 14 and comprises a link of a length which may not be increased (except by manual adjustment) but which may be shortened by compressive forces. Such an adjustment device may be pivotally supported in any suitable manner from the top of frame 3, in a position overlying one of the control links 12. As an example, a support block 21 having a bifurcate end 22 may be bolted to the top of frame 3 with the said end extending over the edge of the frame. A housing member 23 may be pivotally supported between the arms of the end 22 and said housing member is internally threaded to adjustably receive an open-ended, externally threaded, hollow barrel member 24. The barrel member 24 has an enlarged internal chamber 25 extending to an open end, the opposite end of said barrel member having a bore of smaller diameter to support the shaft 26 of a piston 27. The chamber 25 houses a coil spring 28 which is retained in the chamber by an adjustment screw 29 adjustably threaded in a face plate means 30 suitably attached to the barrel member 24.

The shaft 26 of piston 27 is screw threaded as at 31 for adjustable insertion into an internally threaded thimble member 32 having a bifurcate end 33 in which a connecting link 34 is pivotally connected. Link 34 is suitably attached to the adjacent control link 12, as for example by screw threading into a threaded opening in an edge of the link 12, as shown at 35 (Fig. 7). Thus, the effective length of the link 14 relative to the drive roller assembly may be adjusted either by rotation of the barrel member 24 relative to housing member 23 or by rotation of the piston shaft 31 relative to connecting thimble 32, and the roller tension may be changed by adjustment of the position of adjustment screw 29.

In use, the above described drive roller assembly is constructed in two types of units, with the rollers thereof arranged on either side of the frame as may be seen by comparing $R_1$ and $R_2$ in Fig. 1, although the units could be made reversible by the expedient of providing drive gearing on both sides of the rollers. In each case, the general action of the rollers in resiliently moving to provide for size variations in the articles and in being capable of equal constant speed rotation regardless of such movement, is the same whether the rollers are supported in the direction of proposed movement of the articles (as in $R_1$) or in the opposed direction (as in $R_2$). However, these two dispositions of the rollers have different responses to conditions of back-pressure (on the rollers) caused by the work in passing through the rollers and this fact makes it possible, by proper selection and placement of the two types of assemblies, to create a metering conveyer capable of keeping the pieces in contact and in driving them at constant speed through a considerable resistance which may fluctuate under varying conditions. Figs. 9 to 12 are schematic views illustrating the various possible dispositions and conditions in which such drive roller assemblies could operate, and are illustrative of the principles of operation of the coating apparatus and conveyor of this invention, the rollers in each instant being driven at constant speed in directions D to convey the work W.

Figure 4:
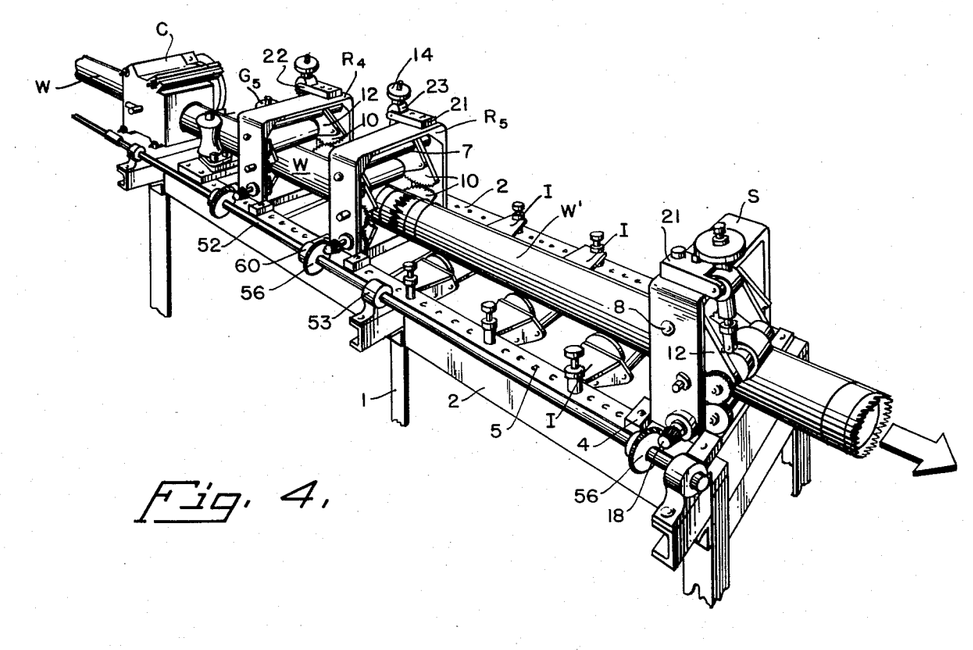
Fig. 4 is a perspective view of a modified post-inhibiting station of the general type shown in Fig. 2 and illustrates the flexibility of the apparatus by virtue of the interchangeability of the positions of the various drive, guide and idler rollers on the guide rails.
Figure 9:
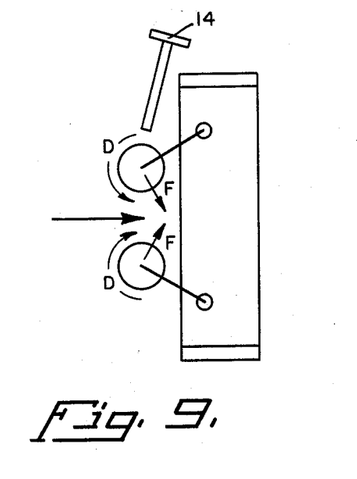
Figs. 9 to 12 are schematic showings of the drive roller assembly in different roller orientation positions and under different conditions, for illustrating the principle of operation of the roller drive assemblies and thus of the conveyer system formed therefrom.
Figure 10:
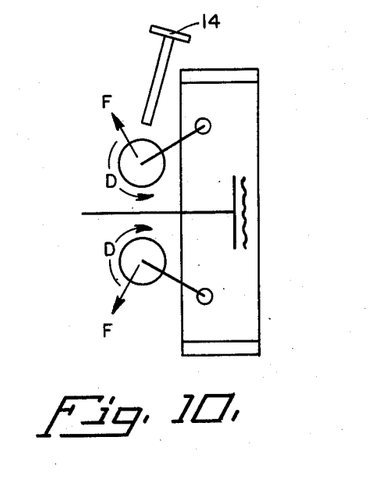
Figure 11:
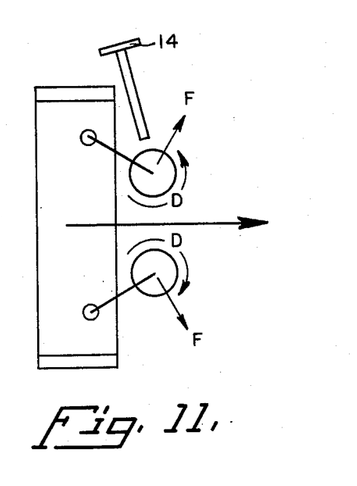
Figure 12:
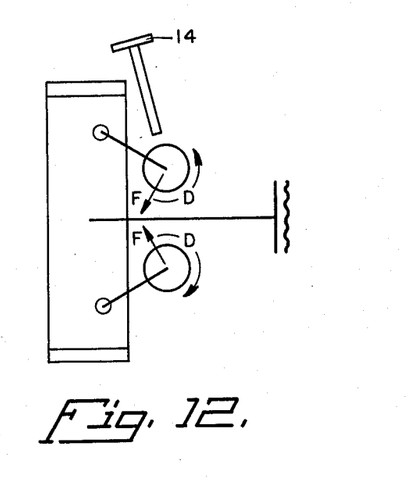

Figs. 9 and 10 schematically illustrate a drive roller unit such as the unit $R_2$ of the pre-inhibiting station of Figs. 1 and 3 or of the units $R_4$ and $R_5$ of Figs. 2 and 4, in which the rollers are disposed in a direction opposed to the direction of movement of the work. The effect of the Fig. 9 arrangement is to prevent surges of speed in the direction of travel. If an article W, driven by the rollers in a direction $D_1$ is suddenly given an impulse (indicated by the arrow) which tends to accelerate it, the roller action will be to tighten down on the article as shown by the forces F and to prevent the surge impulse from traversing past the unit. However, with the same roller disposition, should an article being conveyed hit an obstruction, as indicated in Fig. 10, the rollers will, in effect, "roll up the article" and forces F tending to release the pressure of the rollers on the grain act to allow the rollers to slip on the surface of the article. With the opposite directional disposition of the rollers, the effects are opposite, since a surging of the work through such a unit (see Fig. 11) causes separating forces F to act on the rollers to allow the work to slip through. Conversely, as shown in Fig. 12, when an obstruction is met the effect is to cause the driving rolls to grip the work with greater frictional driving force to overcome momentary obstructions and drive the work through. Units arranged as in Figs. 11 and 12 are used as the entrance unit to the conveying apparatus of the instant invention (see Fig. 1) so that a work piece may be pushed through unit $R_1$ manually or by other conveying means and may be moved freely, at greater speed than the rollers of the unit would drive them (as in Fig. 11) until the work piece abuts the preceding article, at which point the Fig. 12 situation is attained and the rollers bite down upon the work piece to drive it at the desired constant roller speed.

The coating method carried out by the apparatus illustrated in the drawings, as previously described, requires conveying means which will cause pieces of relatively short finite length to abut one another to form a column, to be fed at constant speed through a coating device which forms a sheath over the column and to be then separated to rip or tear the sheath between articles. The device disclosed for performing this function, as, for example, on grains of solid rocket propellant material, comprises separate pre-coating and post-coating stations, the work being fed to the pre-coating conveyor manually or by any suitable conveying means and being conveyed end-to-end by said pre-coating conveyor through a coating device to the post-inhibiting conveyor which is adapted to separate the pieces. A proper selection and disposition of drive roller assemblies of the nature previously described are the main components of the conveying system, along with guide rolls G and idler rolls I which serve to guide and support the work.

The pre-coating station (Fig. 1) has the function of driving the work pieces through the coating device with a high degree of concentric precision and alignment while maintaining an extremely smooth rate of travel. On this station three drive units ($R_1$, $R_2$ and $R_3$) and four guide units ($G_1$, $G_2$, $G_3$, and $G_4$) are mounted, the guide units comprising rolls mounted on opposite sides of the guide rail (see Fig. 3) and arranged for equal and opposite biased pressure against the work pieces to retain them centered properly horizontally relative to their center line, said guide units having the identical structure for performing this function as do the drive roll assemblies (note elements 10, 12, and 14) on the assembly G of Fig. 3 but not having any drive means. Of the three drive units, the first ($R_1$) coincides with the schematic showing of Fig. 11 in both assembly and function. The second drive unit ($R_2$) on the pre-coating station is of the type and functioning shown in Fig. 9. These drive units comprise a "metering device." Drive unit $R_1$ allows the articles to pass freely in the downstream direction and this arrangement allows a grain to pass freely through the $R_1$ unit, motivated either by hand or by mechanical conveyor means from a feed table 36 (as shown in Fig. 1) until it butts up against the article in front. The article in front is prevented from accelerating by the action of unit $R_2$ (see Fig. 9) so a tight mating of abutting surfaces is obtained. In the method performed by the apparatus such tight mating or butting of the surfaces is critical since it is important, in the coating phase, to prevent coating material from coming into the joint between the articles. The pressure on this joint must be maintained until the articles have progressed through the coating cross-head C, for should the butted joint be loose, the plastic coating would be forced between the grains in the coating process. This would cause a tapering of the outside diameter of the coated articles at the ends thereof. By virtue of the roller arrangement, the first drive unit $R_1$, is adapted to maintain such pressure on the last article as to maintain the butted joint under pressure, since, as shown in Fig. 12, the rollers are caused to bear down on said last article when it contacts a preceding article. A third drive unit $R_3$ is mounted exactly as the first in a position to feed articles to the coating device. Should there be any tendency for articles to stick in the coating cross-head C, due to such conditions as oversize grains, expansion by excessive coating cross-head temperatures, etc., the action of this drive roller unit ($R_3$) is to clamp the article being fed and forcibly drive it through the coating cross-head while maintaining the existing speed, as illustrated in Fig. 12. In the pre-coating or pre-inhibiting stage thus far described, guide roll assemblies $G_1$ and $G_2$ are provided to maintain true vertical alignment of the work pieces relative to the center line of the coating device, between successive drive roller assemblies and a pair of guide assemblies $G_3$, $G_4$ are utilized to give similar maximum alignment to the work pieces before they enter the coating cross-head.

The post-coating or post-inhibiting station, as shown in either Fig. 2 or Fig. 4, has the dual functions of assisting in conveying the articles through the coating cross-head at constant speed while maintaining near perfect alignment with the cross-head, and of then separating the articles from their abutting end-to-end columnar relationship to tear the continuous sheath formed around the articles by the coating device. Thus, the sheathed column of articles (designated W in Fig. 4) is received from the coating cross-head and passes to a drive roller assembly $R_4$ after passing through aligning guide roller assembly $G_5$. It should be noted that drive roller assemblies $R_3$ and $R_4$ comprise a second metering device to convey the column of articles through the coating cross-head. In order to reduce the likelihood of marring the coating, which may still be relatively soft at this stage, the pressure of the individual rollers may be reduced by backing up the drive roller assembly $R_4$ with an identical assembly $R_5$ and by reducing the roller pressure of each roller by adjustment of the tension of the spring in the adjustment device 14 of each of said units, the two units then serving the function of a single unit of the Fig. 9 type. Subsequent to passage through the drive roller units $R_4$ and $R_5$, the column of coated work pieces is fed over supporting idler rollers I to the drive roller assembly means S disposed in the Fig. 11 and Fig. 12 direction. Assembly S is capable of accelerating the article gripped thereby to increase its speed whereby the sheathing of coating material is stretched and broken between the article $W^1$ gripped by S and the adjacent article W (still being gripped and driven at lesser speed by drive roller units $R_4$ and $R_5$) to separate the articles. This operation is best shown graphically in Fig. 4 and is accomplished either by a single unit S as in Fig. 4 or by a plurality of units $S_1$, $S_2$ as in Fig. 2 when it is desired to lighten the individual roller pressure on the freshly coated work piece, and the acceleration is accomplished by making the rollers of drive roller assembly S (or of $S_1$ and $S_2$) of greater diameter than those of the other drive roller assemblies so that a simple constant speed drive mechanism may be used for all units of the conveyor.

The various rollers of all of the drive roller assemblies R and S are driven at a common constant speed. Power is derived from an electric motor 38 suitably supported beneath the guide rails 2 on the framework 1 of the pre-coating conveyor. The motor 38 operates through change speed gearing 40 to rotate a horizontally disposed power shaft 42 at a desired constant speed, said shaft extending to a point below the guide rails 2 on the framework 1 of the post-inhibiting station and being provided with suitable bearing means, as shown. Spaced power take-offs 44 and 46 are provided for driving the rollers of the two conveyor stations and these may be in the form of bevel gearing arranged to rotatably drive vertically supported rotatable shafts 48. Shafts 48, at their upper ends 50, are geared (as by worm or bevel gears) to aligned horizontal drive shafts 52 disposed in appropriate bearings 53, alongside guide rails 2 of the two aligned conveyor sections in parallel relationship to said rails. The shafts 52 have a longitudinal keyway, as at 54 (Fig. 3) so that bevel gears 56 may be keyed into the keyway 54 at any desired position depending upon the location of drive roller assemblies R in the locating holes 5 of guide rails 2. Gears 56 are retained on keyed shafts 52 by means of appropriately secured key means 58 in positions to drivingly engage bevel gears 18 on the various drive roller assemblies, and are retained in this position by clamping means 60. In all cases the gears 56 and 18 are identical so that the rollers of all of the drive roller assemblies R and S are driven at equal and constant speeds. The separating or tearing function performed by drive roller assemblies $S_1$ and $S_2$ (Fig. 2 embodiment) or by the assembly S (Fig. 4 embodiment) is effected solely by virtue of the fact that the drive rolls in these assemblies are of greater diameter than in the other units.

From the above description it should be apparent that the present invention provides a new and improved method for coating elongated articles of finite length by causing the articles to be butted against one another in end-to-end relationship, by forming a single sheath of coating material over the column of articles thus formed and by then tearing the sheathing article interfaces by separating the coated articles. As an incident to this new method, the present invention also provides a new method for separating longitudinally abutted articles from one another. Moreover, this invention provides novel apparatus for performing said methods, involving drive roller assembly units of new and improved versatility and combinations of such units which are effective to maintain longitudinal end-to-end contact of adjacent pieces, to provide forcible metered conveying thereof through a coating zone, and to cause forcible separation of the coated articles.

While specific constructions have been disclosed in detail in the description hereinabove, it is to be understood that such specific constructions are merely illustrative and that the specific details of such constructions are not critical either to the method or apparatus ramifications of the present invention. Obviously, many variations and modifications are possible within the scope of the teachings of this disclosure. It is therefore to be understood that the scope of the invention is not intended to be limited by the specific described examples, but rather by the scope and language of the appended claims:

What is claimed is:

1. A metering conveying assembly for the retention of articles of finite length in end-to-end abutting relation and for the metered constant speed longitudinal conveying of said articles along a given path of travel, said assembly comprising two drive roller units arranged in series along said path of travel, each of said units comprising an opposed pair of driven rolls, said rolls all being of equal size, means driving each of said rolls in opposite directions at the same speed to cause constant speed movement of the articles therethrough, each of said drive roller units comprising a frame mounted transverse to said path of travel, a plurality of links, each link having one end pivotally supported on said frame, each of said pair of driven rolls being rotatably mounted on the other ends of said links, the opposed rollers projecting outwardly from the frame along the line of travel of articles therethrough and being free to be moved angularly in response to non-uniformity of thickness of the articles passing therethrough, the first drive roller unit encountered by articles fed into the assembly having means to be disposed with the rolls projecting in the direction of travel whereby articles pushed therethrough against no resistance will tend to raise the rollers to allow movement faster than the roller speed until resistance is met by abutment with a preceding article and whereby said rollers will be adapted to more tightly grip the articles for constant speed drive when such resistance is met, the second roller drive unit encountered by articles passing throug the assembly having means to be disposed oppositely to said first drive roller unit with the rolls projecting in the direction of entry of the articles whereby the rolls of said second unit are operable to tightly grip the article therebetween to compel controlled constant speed drive of said article in response to the impulse given thereto by said abutment of said article entering said first unit against the said preceding article.

2. A conveyor unit comprising a frame adapted to be mounted on a table transverse to the proposed path of travel of slender articles therethrough, a pair of opposed driven conveying rolls, a plurality of links, each link having one end pivotally supported on said frame, each of said pair of opposed driven conveying rolls being rotatably mounted on the other ends of said links whereby the opposed rolls project outwardly from the frame along the line of said path of travel of articles therethrough and are free to be moved angularly in response to nonuniformity of thickness of articles passing therethrough, and gear means attached to said rolls for driving said rolls at equal and opposite rotational speeds and operable to convey articles therethrough, the rolls, when extended in the direction of approach of articles to be conveyed, having means for clamping down on an article to resist any force tending to move an article more quickly than the roll speed and for releasing such article to decrease the driving force if the article meets an obstruction, said rolls, when extended in the direction of travel of articles to be conveyed, being operable to release in response to a force tending to move the article more quickly than the roll speed and to clampingly grip and more forcibly drive the article if said article meets an obstruction.

3. A conveying apparatus for the metered movement of articles of finite length in end-to-end linear columnar arrangement along a path of travel, said apparatus comprising at least first and second drive roller units arranged in series along said path of travel, each of said units comprising a frame mounted traverse of and having sections extending above and below said path of travel, first and second pairs of links, each link including a sector gear, one end of said first pair of links pivotally mounted on the section of frame extending above said path of travel, a first roller rotatably mounted on the other end of said first pair of links, one end of said second pair of links pivotally mounted on the section of frame extending below said path of travel, a second roller rotatably mounted on the other end of said second pair of links, said first and second rollers being axially parallel and opposed for receiving said articles, the gear teeth of the sectors of said first pair of links engaging the gear teeth of the sectors of said second pair of links such that each pair of links and corresponding roller project outwardly from the frame and towards said articles passing between and engaging said rollers, said rollers being free to be moved angularly in response to non-uniformity of thickness of the articles passing therethrough, control means having a variable bias, said control means operatively connected to one of said links for biasing said first and second rollers into engagement with said articles, said first drive roller unit being disposed with each pair of links and corresponding roller projecting outwardly from the frame in the direction of travel of said articles and said second drive roller unit being roller projecting outwardly from the frame in a direction opposite of travel of said articles, drive means rotating the rollers of said first and second drive roller units at a constant speed and in the direction of travel of said articles whereby any force tending to move said article more quickly than the roller speed of said first drive roller unit causes decrease of the driving force exerted by the rollers thereof and any force tending to move said article less quickly causes increase of the driving force, and any force tending to move said article more quickly than the roller speed of said second drive roller unit causes increase of the driving force exerted by the rollers thereof and any force tending to move said article less quickly causes decrease of the driving force, and thereby maintaining said articles at constant speed and in end-to-end contact.

References Cited in the file of this patent

UNITED STATES PATENTS

| | | |
|---|---|---|
| 899,492 | Leonard | Sept. 22, 1908 |
| 1,696,037 | Hornberger | Dec. 18, 1928 |
| 1,699,972 | Jones | Jan. 22, 1929 |
| 2,596,284 | Peters | May 13, 1952 |
| 2,596,285 | Peters | May 13, 1952 |
| 2,693,273 | Kopplin | Nov. 2, 1954 |

FOREIGN PATENTS

| | | |
|---|---|---|
| 1,117,058 | France | Feb. 13, 1956 |